United States Patent

[11] 3,552,674

[72] Inventor R. Dell Hull
6101 E Apache St., Tulsa, Okla. 74106
[21] Appl. No. 767,640
[22] Filed Oct. 15, 1968
[45] Patented Jan. 5, 1971
Original application July 28, 1965, Ser. No. 475,365, now Patent No. 3,416,746.
Divided and this application Oct. 15, 1968, Ser. No. 767,640

[54] SPINNING REEL
2 Claims, 8 Drawing Figs.
[52] U.S. Cl. ................................................ 242/84.2, 242/84.5
[51] Int. Cl. ....................................................... A01k 89/00
[50] Field of Search ........................................... 242/84.2, 84.2(A), 84.2(F), 84.2(G), 84.2(H), 84.2(I), 84.21(A), 84.5, 84.5A, 84.51, 84.51A

[56] References Cited
UNITED STATES PATENTS
| | | | |
|---|---|---|---|
| 2,707,597 | 5/1955 | Rotsler | 242/84.2(F) |
| 2,903,202 | 9/1959 | Sarah | 242/84.2(A) |
| 2,989,266 | 6/1961 | Yeada | 242/84.2(A) |
| 3,006,573 | 10/1961 | Holahan, Jr. | 242/84.2(A) |
| 3,020,666 | 2/1962 | Hull | 242/84.21X |

Primary Examiner—Billy S. Taylor
Attorney—Mandeville and Schweitzer

ABSTRACT: This closed-face spinning reel has a cup-shaped pickup head provided with notches for winding fishing line onto a normally stationary spool upon rotation of the pickup head about the spool. The spool has its forward wall near the outer periphery turned rearwardly and outwardly and then reversely bent forwardly and outwardly to define a double flange terminating at a diameter slightly less than that of the pickup head. The spool is normally held stationary by a radially adjustable friction brake engageable with a rearwardly extending hub on the spool. The spool can be rotated by a pull on the line that overcomes the frictional setting of said brake. Teeth at the rear side of the spool cooperate with a leaf spring to give an audible signal upon rotation of the spool. The pickup head and spool mechanism and pickup head drive mechanism are respectively located on opposite sides of a transverse frame wall. Front and rear covers are connected at opposite sides of said frame wall by pins and a cover lock screw.

INVENTOR.
R. DELL HULL
BY Mandeville & Schweitzer
ATTORNEYS

INVENTOR.
R. DELL HULL

BY Mandville & Schweitzer
ATTORNEYS 3,552,674

SPINNING REEL

CROSS REFERENCE TO RELATED APPLICATIONS

This application is a division of copending application Ser. No. 475,365, filed July 28, 1965, now U.S. Pat. No. 3,416,746.

BACKGROUND OF INVENTION

In closed-face spinning reels, the line spool is mounted on a reel frame and enclosed within a casing normally provided with a front portion or cover, which may be of conical or concave form having a central opening or eye through which the line travels as it moves forwardly over the front face or flange of the line spool in passage to and from the spool, the line opening being ordinarily coaxial with the axis of the spool. Reels of this general type are illustrated in U.S. Pat. No. 3,059,873.

In spinning reels of the general type so described, a normally nonrotatable line spool is mounted on a hub for limited slippage or "drag" relative to the reel frame body to accommodate controlled withdrawal of line from the spool by a fish to prevent breakage of the line. An important aspect of the present invention is the provision of a simplified and efficient line spool and clicking arrangement for closed face spinning reels.

SUMMARY OF THE INVENTION

More specifically, forward portions of the spool are surrounded by a double flange, the outer portion of which extends parallel to the horizontal axis of the reel and decreases the effective width of the mouth of the spool. In accordance with the principles of the invention, this decreases the axial travel required to move a notched pickup head between a forward, casting position in which the notches of the pickup head are "clear" of line traveling thereover and a rearward, line retrieval position at central portions of the spool in which the notches are exposed to the line. With this new and improved arrangement, and as will be understood, a reel assembly may be made more compact without any reduction of the line carrying capacity of the spool.

DESCRIPTION OF DRAWINGS

For a more complete understanding of the present invention and its attendant advantages. Reference should be made to the following detailed description taken in conjunction with the accompanying drawings, in which.

DESCRIPTION OF PREFERRED EMBODIMENT

Figure 1:
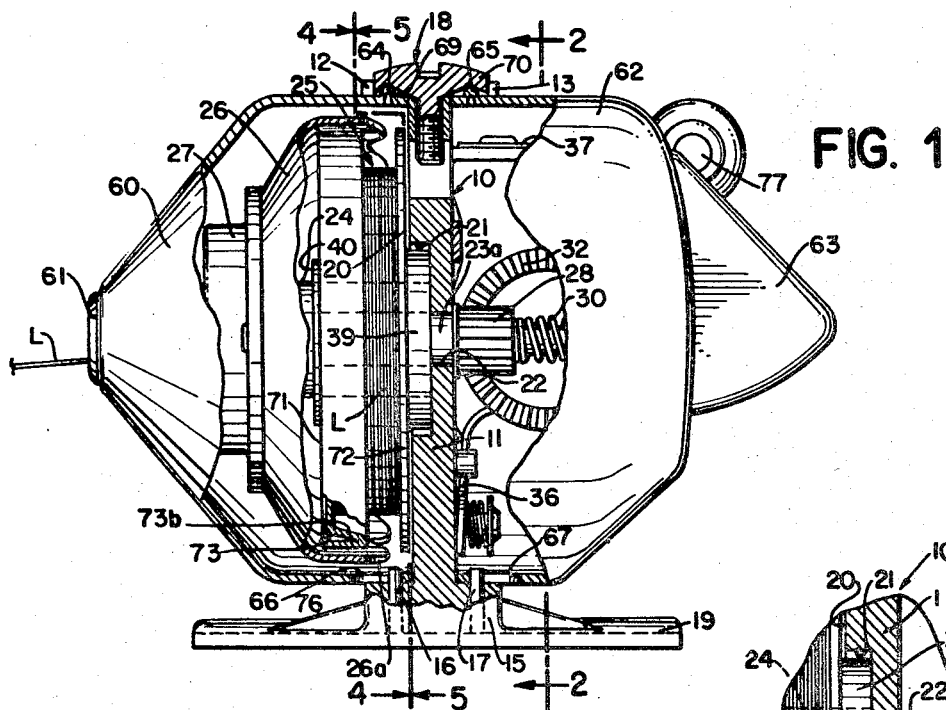
FIG. 1 is a side elevational view, with parts broken away to show details of construction, of an improved fishing reel construction embodying the principles of the invention.
Figure 2:
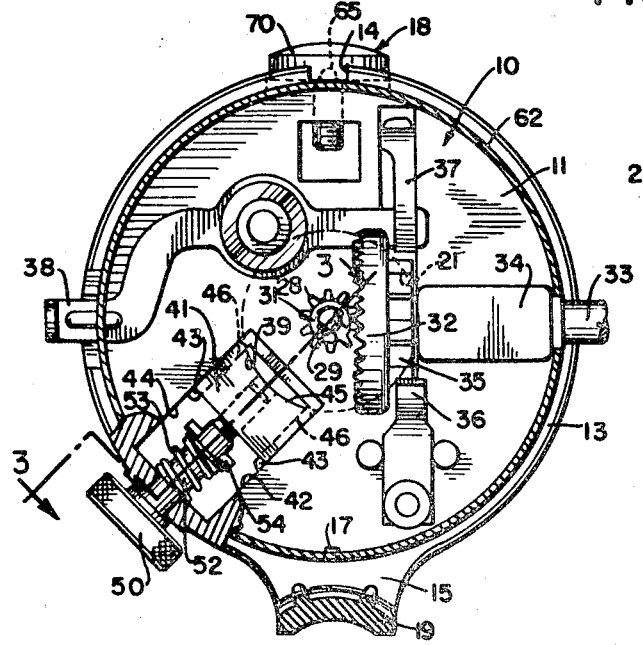
FIG. 2 is a transverse cross-sectional view of the improved reel taken along line 2—2 of FIG. 1.
Figure 7:
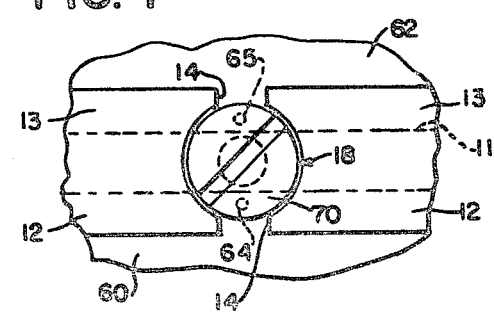
FIG. 7 is a fragmentary plan view showing the disposition of the cover lock screw in the reel frame body.

With reference to FIGS. 1 and 2, the fishing reel of the present invention includes a reel frame body 10 having a substantially circular, transverse wall 11 from which axially extending front and rear peripheral flanges 12, 13 project. The flanges 12, 13 are substantially continuous, being interrupted only by an upper axial opening 14 extending thereacross (FIG. 7). The reel frame includes a reinforced base portion 15 supporting front and rear cover pins 16, 17 projecting radially inwardly through lower portions of the front and rear peripheral flanges 12, 13, and a diametrically opposed cover lock screw 18 disposed in the opening 14 and threaded into the wall 11. An integral reel supporting plate 19 extends from the base portion 15.

Figure 3:
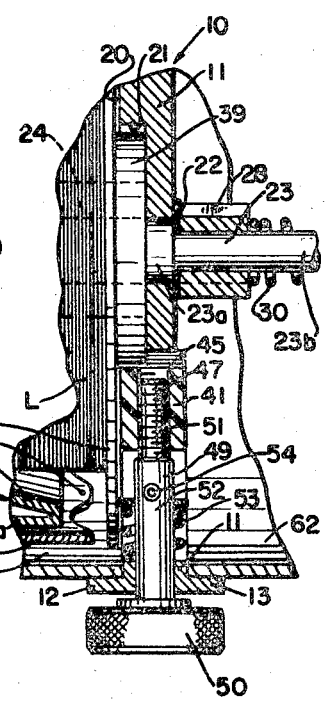
FIG. 3 is an enlarged, fragmentary, cross-sectional view of the reel taken along line 3—3 of FIG. 2, showing the drag brake arrangement.

At the front face 20 of the transverse wall 11 (FIG. 4), a circular recess 21 is defined concentrically with an axial bore 22 which supports a rotatable and axially slidable main shaft 23 (FIG. 3). The frame body also includes an integral, forwardly projecting cylindrical hub 24 upon which a normally nonrotatable line spool 25 is mounted concentrically with the main shaft 23. More specifically, the main shaft 23 is stepped, having forward portions 23a of greater diameter than its rearward portions 23b. A notched line pickup head 26, including a line braking element 27, is carried by the forward end of the main shaft for rotation and axial movement therewith. A pinion 28 is keyed to the main shaft by a flat 29 formed thereon. As shown, the shaft is maintained under a rearward bias by a coil spring 30 acting between the pinion and a clip 31 (FIG. 2) fixed to a rearwardmost portion of the shaft.

Positive rotation of the main shaft 23 may be effected through a ring gear 32 carried by the inner end of a crankshaft 33 which is mounted in a rearwardly projecting boss 34 integral with the frame 10. A ratchet gear 35 is also carried by the crankshaft 33 and is adapted to cooperate with an antireverse pawl 36 and a click finger 37, selectively operated by a control lever 38 in a manner set forth in greater detail in the aforementioned U.S. Pat. No. 3,059,873. Manual rotation of the crank 33 to retrieve paid-out line is accomplished through a handle 77 mounted on its distal end.

The line spool 25 includes parallel front and rear walls 71, 72, respectively. As shown in FIGS. 1 and 3, forward portions of the spool are surrounded by a double flange 73, the outer portion 73a of which extends parallel to the horizontal axis of the reel and decreases the effective width of the mouth of the spool. This decreases the axial travel required to move the pickup head 26 between the forward, casting position in which the notches 26a of the pickup head are "clear" of line traveling thereover and a rearward, line retrieval position at central portions of the spool (FIG. 1) in which the notches are exposed to the line. With this arrangement, the reel assembly may be made more compact without any reduction of the line carrying capacity of the spool. For improved operation of the reel, it is particularly advantageous that the inner portion 73b of the double flange 73 be tapered approximately 30° with respect to the longitudinal axis of the reel and that it extend from the front spool wall 71 at a radius greater than that of the maximum level of the line L, as shown in FIG. 3.

An improved drag brake is provided to accommodate limited rotation or slippage of the line spool relative to the reel frame. Such rotation permits a hooked fish to exert a pulling force on the line without causing its failure. More specifically, as shown in FIG. 1, the line spool 25 includes a rearwardly projecting annular friction surface 39 disposed within the circular recess 21 and held seated therein and against the wall 11 by a C-clip 40 on the forwardly projecting cylindrical hub 24. A radially directed rectangular opening 42 of sufficient length to intersect the circular recess 21 is provided in the transverse wall 11 of the reel frame. The spool 25, through its friction surface 39, is controllably restrained from rotation by a drag brakeshoe 41 which is radially displaceable within the rectangular opening 42.

More specifically, the shoe is a plastic block which advantageously has an inner arcuate face 45 in general conformity with the contour of the annular surface 39 of the line spool. A pair of grooves 46 are formed in the sidewalls of the shoe in order that it may be keyed to guide tracks 43 formed on the sidewalls 44 of the opening 42 for translation therealong. The brakeshoe also includes an internally threaded bore 47 which is engaged by a screwjack actuator 49. As shown best in FIG. 3, the screwjack actuator is stepped and includes an enlarged, knurled head 50, a threaded (right-handed) drive portion 51, and an enlarged shank portion 52.

Arrangements have been provided to provide varying degrees of braking force through the brakeshoe 41 to the annular surface 39. To that end, a coil spring 53 acts radially between a pinned stop 54 in the shank portion of the actuator 49 and the reel frame 10 and urges the actuator and brakeshoe inwardly, maintaining the shoe in a normal "on" position in which it bears against the line spool. Therefore, counterclockwise rotation of the actuator 49, with the brakeshoe in the "on" position, will cause the threaded drive portion 51 of the actuator 49 to tend back out of the shoe 41 (the shoe being prevented from radial inward translation in the opening by virtue of its engagement with the friction surface 39) causing the compression of the spring 53 and a consequent increase in the braking force. Continued counterclockwise rotation of the actuator 49 will variably increase the braking force until the spring 53 is fully compressed and the braking force is maximized. Advantageously, selective, fine adjustment of the degree of drag exerted by the brakeshoe 41 against the friction surface 39 of the spool (variation of the compression in the spring 53) may be had within one or two turns of the screwjack actuator 49. Of course, clockwise rotation of the actuator tends to reduce the degree of braking force.

Figure 4:
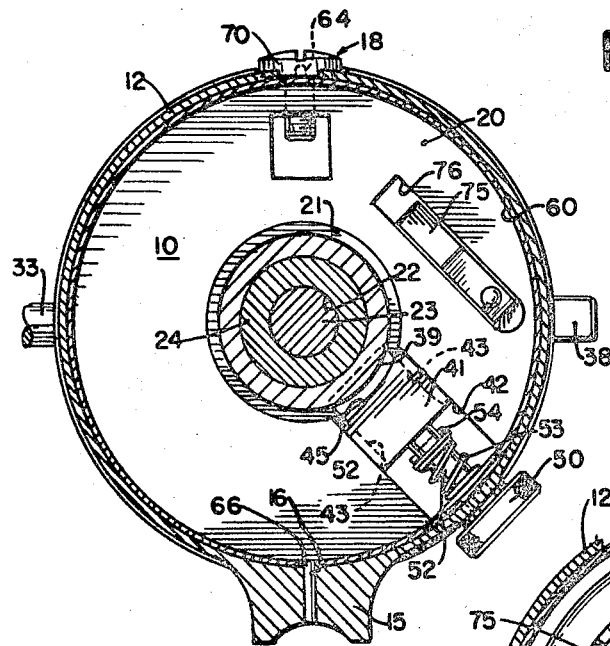
FIGS. 4 and 5 are transverse, cross-sectional views of the reel taken along lines 4—4 and 5—5, respectively, of FIG. 1.

Since the brakeshoe is keyed within the opening 42 by the tracks 43, further clockwise rotation of the actuator tends to drive the shoe radially outward along the tracks 43 and effects the withdrawal of the brakeshoe from contact with the annular surface 39 of the line spool. As will be understood, rotation in this direction may be continued until the shoe is completely withdrawn from the shoulder of the spool and the shoe is stopped against the shank 52 (FIG. 4). In this position, the drag brake is "off" and no restraint is imposed upon the line spool 25. A counterclockwise rotation of the knurled head 50 of the actuator will, of course, cause the shoe to be advanced inwardly along the tracks 43 returning it into the "on" position.

Figure 5:
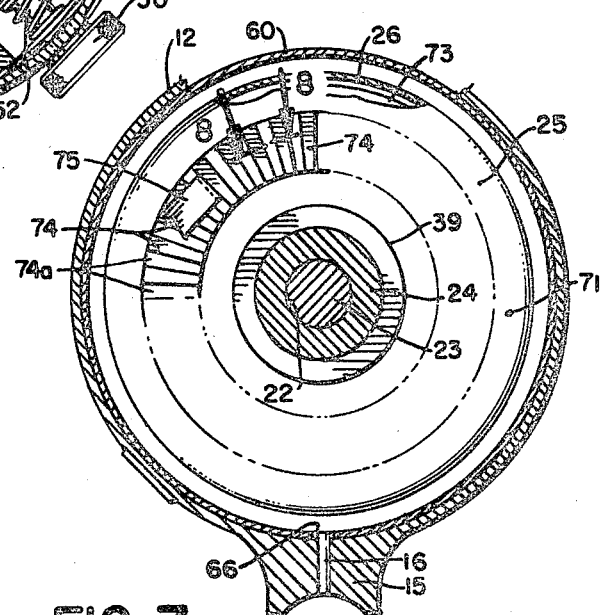
Figure 6:
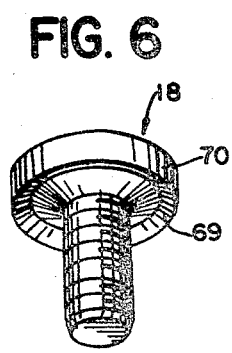
FIG. 6 is a perspective view of the cover lock screw.
Figure 8:
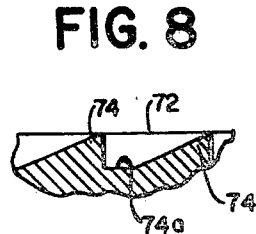
FIG. 8 is an enlarged cross-sectional view taken along line 8—8 of FIG. 5 to show more clearly certain details of construction of the line spool.

In accordance with the present invention, a drag alarm mechanism is incorporated into the reel structure. To that end, a series of spaced ratchetlike teeth 74 (FIGS. 5 and 8), arrayed concentrically with the annular friction surface 39, are formed within the rear wall 72 of the line spool 25 while a pawllike, flexible arm 75, advantageously a cantilevered leaf spring, is disposed in and projects axially forwardly from a rectangular recess 76 formed in the front face 20 of the wall 11 (FIG. 4) at a radial position coincident with that of the ratchet teeth. Thus, when the spool is rotated or dragged about the hub 24 by a hooked fish paying out line L, the pawllike arm 75 will repeatedly engage the ratchet teeth 74 and strikingly drop off into the valley portions 74a therebetween to provide an audible sound or alarm indicative of a strike by a fish. As will be appreciated, the components of the alarm mechanism are physically disposed within facing, abutting walls of two of the main elements of the reel, the spool and reel frame. Accordingly, and as an important aspect of the invention, the drag alarm mechanism may be incorporated into the reel assembly without enlarging its size.

The above-described reel assembly is enclosed by a cup-shaped front cover 60, including a central opening or eye 61 through which the line L may travel and a cup-shaped rear cover 62 including a pivotable thumb plate 63 for moving the shaft 23 into forward line braking and casting positions from a rearward retrieval position as is conventional in reels of this type.

The cylindrical walls of the covers are of a diameter slightly less than that of the peripheral flanges of the frame body and include raised buttonlike projections 64, 65 and diametrically opposed slots 66, 67 at their marginal edges. The covers 60, 62 may be readily assembled to the reel frame 10 to complete the closed-face assembly by placing the slots 66, 67 over the projecting pins 16, 17, thereby forming a hinge, and pivoting the covers thereabout until the edges of the cover flanges abut the faces of the reel frame. In this position the covers 60, 62 are closely embraced by the frame flanges 12, 13 in a nested relation (FIG. 3) and the buttonlike projections 64, 65 are disposed in the opening 14. As shown in FIG. 7, the opening 14 includes narrow, rectangular throat portions at its ends accommodative of the projections 64, 65 and wide, circular portions at its center accommodative of the lock screw 18.

The covers 60, 62 are securely locked in place by the special lock screw 18 which has an annular groove or recess 69 formed in the underside of its head 70. Tightening down of the locking screw traps both of the locking buttons 64, 65 in the annular groove 69 to hold the covers firmly in place. Conversely, both of the covers may be simply and rapidly released for removal from the frame by loosening the screw to retract the recess 69 to a position clear of the projecting buttons. Advantageously, the locking and releasing travel of the lock screw 18 may be no more than a few turns.

It should be appreciated that the new drag brake alarm and improved spool arrangement may be incorporated into the design of closed-face spinning reels to simplify their operation, and attribute of extreme importance in the construction of reels for children and other novice fishermen. Moreover, the novel arrangements may be manufactured with minimum expense.

It should be understood that the spinning reel herein illustrated and specifically described is intended to be representative only, as certain changes may be made therein without departing from the clear teachings of the disclosure. Accordingly, reference should be made to the following appended claims in determining the full scope of the invention.

I claim:
1. A spinning reel assembly including:
 a. a reel frame having forwardly facing and rearwardly facing walls;
 b. a shaft extending through said reel frame and defining a predetermined axis;
 c. a line spool supported adjacent said front face on a hub means projecting forwardly from said frame, said line spool having an outer flange generally concentric with said axis;
 d. notched pickup head means supported by said shaft on a forward side of said frame and adapted to closely embrace said outer flange of said line spool;
 e. means mounting said shaft for rotation and limited axial displacement relative to said reel frame;
 f. said line spool including spaced, substantially parallel front and rear walls;
 g. inner flange means extending rearwardly and outwardly from said front wall for a predetermined distance and defining with said outer flange an approximate 30° angle therewith, said outer flange extending forwardly and parallel to the horizontal axis of said reel; and
 h. said inner and outer flange means being joined at a rounded, smooth edge and together forming a double flange means, whereby the opening of said spool between its front and rear walls is effectively reduced by said double flange means.

2. A spinning-reel assembly as defined in claim 1, including:
 i. said rear spool wall having ratchetlike teeth formed in a circular array therein;
 j. said forwardly facing frame wall and said rear spool wall being maintained in a face-to-face relation;
 k. said forwardly facing frame wall defining a longitudinal recess therein generally tangentially adjacent the circular array of said teeth; and
 l. a rectilinear leaf spring means having a pawllike free end, said spring means being cantilevered in said recess; said pawllike free end being adapted to engage said teeth as said line spool rotates to provide an audible sound.